(12) United States Patent
Qi et al.

(10) Patent No.: US 12,261,277 B2
(45) Date of Patent: Mar. 25, 2025

(54) LIQUID COOLING PLATE AND BATTERY MODULE

(71) Applicant: XIAMEN HITHIUM ENERGY STORAGE TECHNOLOGY CO., LTD., Fujian (CN)

(72) Inventors: Haiming Qi, Fujian (CN); Chunsheng Hong, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/735,216

(22) Filed: Jun. 6, 2024

(65) Prior Publication Data
US 2024/0429486 A1 Dec. 26, 2024

(30) Foreign Application Priority Data
Jun. 21, 2023 (CN) .......................... 202310736886.5

(51) Int. Cl.
*H01M 10/6555* (2014.01)
*H01M 10/613* (2014.01)
*H01M 10/6557* (2014.01)
*H01M 10/6568* (2014.01)

(52) U.S. Cl.
CPC ..... *H01M 10/6555* (2015.04); *H01M 10/613* (2015.04); *H01M 10/6557* (2015.04); *H01M 10/6568* (2015.04)

(58) Field of Classification Search
CPC ........... H01M 10/6555; H01M 10/613; H01M 10/6557; H01M 10/6568
See application file for complete search history.

(56) References Cited

FOREIGN PATENT DOCUMENTS

| CN | 206834267 U | * | 1/2018 |
|---|---|---|---|
| CN | 208208922 U | | 12/2018 |
| CN | 215816174 U | | 2/2022 |
| CN | 114583326 A | | 6/2022 |
| CN | 216928707 U | | 7/2022 |
| CN | 216980697 U | | 7/2022 |

(Continued)

OTHER PUBLICATIONS

English translation of CN-206834267-U (Year: 2018).*

(Continued)

*Primary Examiner* — Ula C Ruddock
*Assistant Examiner* — Sarika Gupta

(57) ABSTRACT

Provided are a liquid cooling plate and a battery module. The liquid cooling plate has a first liquid cooling portion and a second liquid cooling portion that are perpendicular to each other. The first liquid cooling portion is located at a middle position of the second liquid cooling portion in a first direction. The liquid cooling plate includes: a first plate body having a one-piece structure and including the first liquid cooling portion and a cover body portion of the second liquid cooling portion, the first plate body having a first flow channel of the first liquid cooling portion; and a second plate body having a one-piece structure and fixedly connected to the cover body portion, a second flow channel of the second liquid cooling portion being defined between the second plate body and the cover body portion. The first flow channel is in communication with the second flow channel.

19 Claims, 10 Drawing Sheets

(56) References Cited

FOREIGN PATENT DOCUMENTS

| | | | |
|---|---|---|---|
| CN | 115275435 A | 11/2022 |
| CN | 115312905 A | 11/2022 |
| CN | 217933986 U | 11/2022 |
| CN | 218568996 U | 3/2023 |
| CN | 218769764 U | 3/2023 |
| CN | 116169397 A | 5/2023 |
| CN | 116487772 A | 7/2023 |
| WO | 2023100016 A1 | 6/2023 |

OTHER PUBLICATIONS

The First Office Action from corresponding Chinese Application No. 202310736886.5 dated Aug. 1, 2023. English translation attached.
The Second Office Action from corresponding Chinese Application No. 202310736886.5 dated Aug. 25, 2023. English translation attached.
The Grant Notice from corresponding Chinese Application No. 202310736886.5 dated Sep. 16, 2023. English translation attached.
International Search Report dated Apr. 24, 2024 in International Application No. PCT/CN2024/076079. English translation attached.
Written Opinion of the International Search Authority dated Apr. 24, 2024 in International Application No. PCT/ CN2024/076079. English translation attached.

* cited by examiner

LIQUID COOLING PLATE AND BATTERY MODULE

CROSS-REFERENCE TO RELATED APPLICATION

This application claims priority to Chinese Patent Application No. 202310736886.5 filed on Jun. 21, 2023, the entire disclosure of which is incorporated herein by reference.

FIELD

The present disclosure relates generally to the field of liquid cooling apparatus technologies, and more particularly, to a liquid cooling plate and a battery module.

BACKGROUND

Secondary batteries generate a large amount of heat during a charging and discharging process. An accumulation and an uneven distribution of heat in a battery directly endangers electrochemical performance and safety performance of the battery. When the battery has a high temperature, battery performance decreases and the battery is prone to experience a thermal runaway, which in serious cases causes the battery to catch fire or even explode. For this reason, reasonable cooling measures need to be adopted for a battery module or a battery box. Under an operation condition of a harsh temperature environment, the battery needs to be heated and cooled appropriately, such that the battery operates within its reasonable temperature range to ensure thermal safety performance of the battery.

SUMMARY

In a first aspect, the present disclosure provides a liquid cooling plate having a first liquid cooling portion and a second liquid cooling portion that are perpendicular to each other, the first liquid cooling portion being located at a middle position of the second liquid cooling portion in a first direction. The liquid cooling plate includes a first plate body, a second plate body and a third plate body. The first plate body has a one-piece structure. The first plate body includes the first liquid cooling portion and a cover body portion of the second liquid cooling portion, and the first plate body has a first flow channel of the first liquid cooling portion. The first plate body includes a first part, a second part, a third part, and a fourth part that are bent consecutively. The second part and the third part are arranged opposite to each other to form the first liquid cooling portion. The cover body portion is formed by the first part and the fourth part, the first part has an end connected to an end of the fourth part, the first part and the fourth part extend in opposite directions from respective ends connected to each other. The second plate body has a one-piece structure and is fixedly connected to the cover body portion, a second flow channel of the second liquid cooling portion being defined between the second plate body and the cover body portion. The first flow channel is in communication with the second flow channel. The second plate body has a third flow sub-channel formed through stamping, the third flow sub-channel including a groove surface and a bottom surface, the bottom surface protruding in a direction away from a side of the cover body portion, and the second flow channel being defined by the third flow sub-channel and the cover body portion. The third plate body is disposed at a side of the second plate body away from the cover body portion, the bottom surface of the third flow sub-channel being in contact with the third plate body, a thermal insulation passage being formed between the third plate body and a part of the second plate body not participating in forming the second flow channel, and the thermal insulation passage being filled with a thermal insulation material. The first plate body and the second plate body are in face-to-face contact and sealingly connected to each other at positions corresponding to the thermal insulation passage. The liquid cooling plate has a fixation hole penetrating the second liquid cooling portion and formed at an outer side of the second flow channel. Each of the first part and the fourth part has a sealing portion configured to form the fixation hole, the sealing portion extending towards a side close to the second plate body, and the second plate body having a passage hole for passage of the sealing portion. A seal is further disposed between the second plate body and the third plate body and configured to seal the fixation hole, the seal having an outer diameter greater than a diameter of the fixation hole at the third plate body.

In a second aspect, the present disclosure provides a battery module. The battery module includes at least two battery cells and a liquid cooling plate. The liquid cooling plate having a first liquid cooling portion and a second liquid cooling portion that are perpendicular to each other, the first liquid cooling portion being located at a middle position of the second liquid cooling portion in a first direction. The liquid cooling plate includes a first plate body, a second plate body and a third plate body. The first plate body has a one-piece structure. The first plate body includes the first liquid cooling portion and a cover body portion of the second liquid cooling portion, and the first plate body has a first flow channel of the first liquid cooling portion. The first plate body includes a first part, a second part, a third part, and a fourth part that are bent consecutively. The second part and the third part are arranged opposite to each other to form the first liquid cooling portion. The cover body portion is formed by the first part and the fourth part, the first part has an end connected to an end of the fourth part, the first part and the fourth part extend in opposite directions from respective ends connected to each other. The second plate body has a one-piece structure and is fixedly connected to the cover body portion, a second flow channel of the second liquid cooling portion being defined between the second plate body and the cover body portion. The first flow channel is in communication with the second flow channel. The second plate body has a third flow sub-channel formed through stamping, the third flow sub-channel including a groove surface and a bottom surface, the bottom surface protruding in a direction away from a side of the cover body portion, and the second flow channel being defined by the third flow sub-channel and the cover body portion. The third plate body is disposed at a side of the second plate body away from the cover body portion, the bottom surface of the third flow sub-channel being in contact with the third plate body, a thermal insulation passage being formed between the third plate body and a part of the second plate body not participating in forming the second flow channel, and the thermal insulation passage being filled with a thermal insulation material. The first plate body and the second plate body are in face-to-face contact and sealingly connected to each other at positions corresponding to the thermal insulation passage. The liquid cooling plate has a fixation hole penetrating the second liquid cooling portion and formed at an outer side of the second flow channel. Each of the first part and the fourth part has a sealing portion configured to form the fixation hole, the sealing portion extending towards a side close to the second plate body, and the second plate body having a passage hole for passage of the sealing portion. A seal is further disposed between the second plate body and the third plate body and configured to seal the fixation hole, the seal having an outer diameter greater than a diameter of the fixation hole at the third plate body.

BRIEF DESCRIPTION OF THE DRAWINGS

Other features, objects, and advantages of the present disclosure will become more apparent by reading the detailed description of non-limiting embodiments made with reference to the following accompanying drawings.

In the accompanying drawings:
100, liquid cooling plate;
10, first liquid cooling portion; 20, second liquid cooling portion; 30, first flow channel; 40, second flow channel; 110, first plate body; 120, second plate body; 130, third plate body;
101, first part; 102, second part; 103, third part; 104, fourth part; 105, cover body portion; 111, first side surface; 112, second side surface; 113, first bent portion; 114, second bent portion; 115, third bent portion; 116, first flow sub-channel; 117, second flow sub-channel;
310, first straight segment; 320, second straight segment; 330, first detour segment; 301, first sub-channel; 302, second sub-channel; 303, first detour sub-channel; 304, third sub-channel; 305, fourth sub-channel; 306, second detour sub-channel;
211, first surface; 212, second surface; 213, third flow sub-channel; 410, third straight segment; 420, fourth straight segment; 430, second detour segment;
2101, groove surface; 2102, bottom surface; 50, first port; 60, second port; 70, third port; 80, fourth port; 90, external pipe; 1010, liquid inlet pipe; 1020, liquid outlet pipe;
510, recess; 520, diversion groove; 530, thermal insulation passage; 540, rivet; 550, fixation hole; 560, sealing portion; 570, passage hole; 580, seal;
200, battery cell; 300, connection sheet; 400, first heat conduction pad; 500, second heat conduction pad; 201, first surface; 202, second surface; 203, third surface.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only parts related to the present disclosure are illustrated in the accompanying drawings.

It should be noted that, the embodiments of the present disclosure and features in the embodiments can be combined with each other without any conflict. The present disclosure will be described in detail below with reference to the accompanying drawings and in conjunction with the embodiments.

As a main component of a thermal management system of the battery module, a liquid cooling plate undertakes functions such as cooling, heating, and temperature equalization of the battery. However, most of the battery modules in the industry have a relatively low thermal management efficiency in active thermal management and an unsatisfactory overall temperature uniformity.

In view of the above defects or deficiencies in the related art, a liquid cooling plate and a battery module are provided, which can improve an overall temperature uniformity of a battery module and improve a thermal management efficiency.

Figure 1:
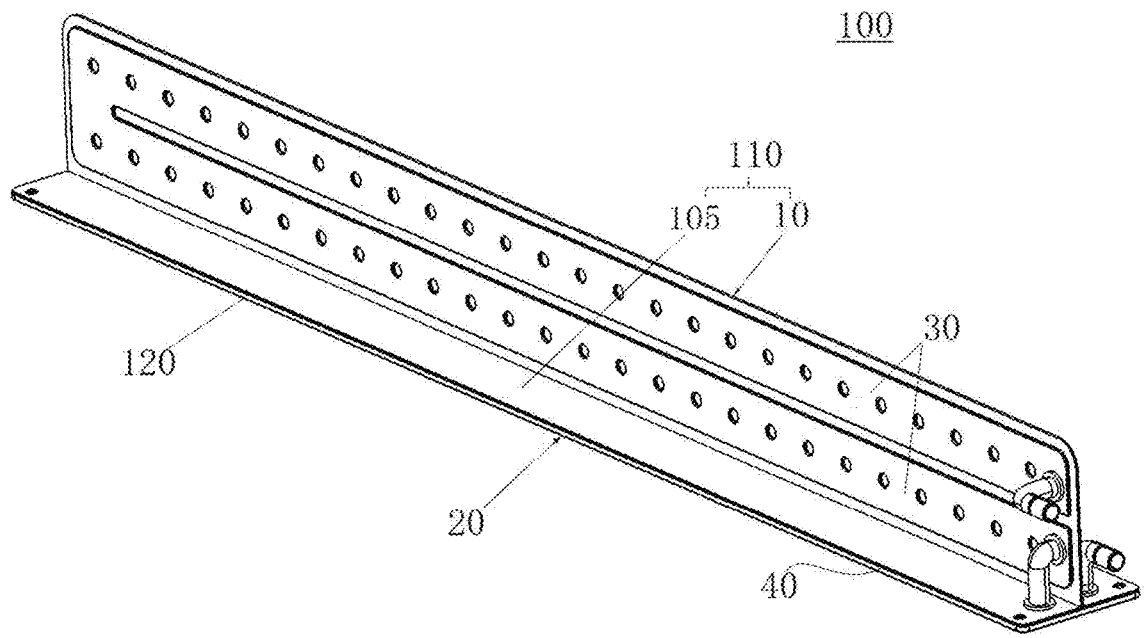
FIG. 1 is a schematic view of a structure of a liquid cooling plate according to an embodiment of the present disclosure.

As illustrated in FIG. 1, the present disclosure provides a liquid cooling plate 100 having a first liquid cooling portion 10 and a second liquid cooling portion 20 that are perpendicular to each other. The first liquid cooling portion 10 is located at a middle position of the second liquid cooling portion 20 in a first direction. The liquid cooling plate 100 includes a first plate body 110 and a second plate body 120. The first plate body 110 has a one-piece structure. The first plate body 110 includes the first liquid cooling portion 10 and a cover body portion 105 of the second liquid cooling portion 20, and the first plate body 110 has a first flow channel 30 of the first liquid cooling portion 10. The second plate body 120 has a one-piece structure and is fixedly connected to the cover body portion 105. A second flow channel 40 of the second liquid cooling portion 20 is defined between the second plate body 120 and the cover body portion 105. The first flow channel 30 is in communication with the second flow channel 40.

In the present disclosure, the liquid cooling plate 100 with a T-shaped structure is formed by the first liquid cooling portion 10 and the second liquid cooling portion 20 that are perpendicular to each other, in such a manner that simultaneous heating or simultaneous cooling for a bottom surface of a battery module and a side surface of the battery module can be realized. Also, a large heat exchange area is provided, and thus a contact area between the liquid cooling plate 100 and a battery cell 200 can be increased, improving uniformity of heat exchange. Simultaneous cooling or simultaneous heating for the bottom surface of the battery cell 200 and the side surface of the battery cell 200 can be accomplished by only one external heating or cooling circulation system, reducing complexity of the external circulation system. In the present disclosure, each of the first plate body 110, the second plate body 120, and a third plate body 130 may be made of aluminum, which has a high thermal conductivity and allows processing techniques such as bending and stamping to be implemented easily.

The manufacturing process and the mounting process of the liquid cooling plate 100 are simple. The liquid cooling plate 100 has a high space utilization rate and satisfactory sealing performance, is free from a risk of liquid leakage, provides a thermal management system with a high structural strength, and has a uniform flow distribution for a medium. With the liquid cooling plate 100 in the present disclosure, heating, cooling, or heat preservation of the battery cells 200 can be achieved to ensure that the battery cells 200 operate within an appropriate temperature range, which reduces a risk of a thermal failure of a battery.

Figure 2:
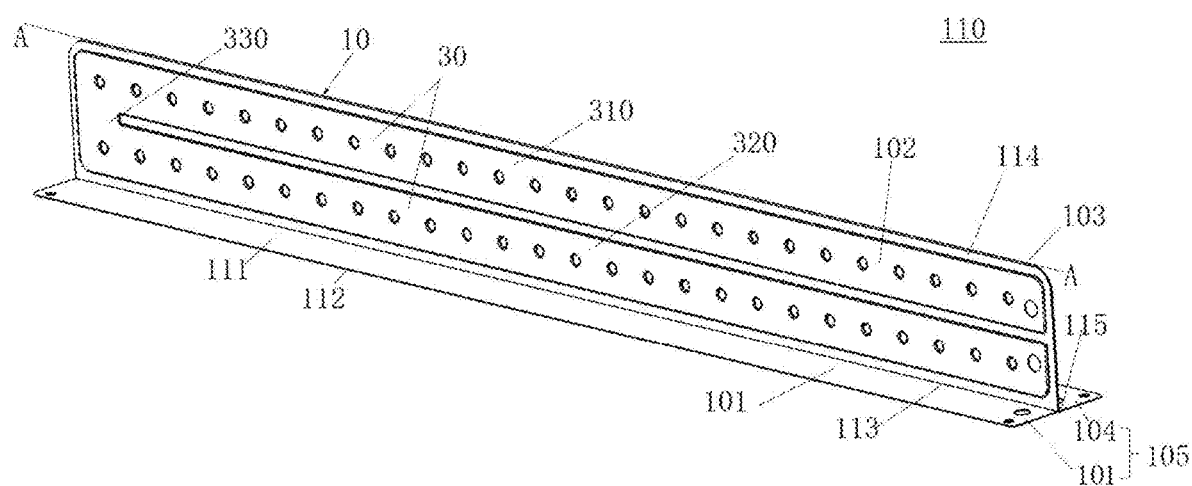
FIG. 2 is a schematic view of a structure of a first plate body according to an embodiment of the present disclosure.

As illustrated in FIG. 2, the first plate body 110 includes a first part 101, a second part 102, a third part 103, and a fourth part 104 that are arranged consecutively. A bending angle between the first part 101 and the second part 102 is equal to or approximately equal to 90 degrees. A bending angle between the second part 102 and the third part 103 is equal to or approximately equal to 180 degrees. A bending angle between the third part 103 and the fourth part 104 is equal to or approximately equal to 90 degrees. The first part 101 has an end connected to an end of the fourth part 104. The first part 101 and the fourth part 104 extend in opposite directions from respective ends connected to each other. The cover body portion 105 is formed by the first part 101 and the fourth part 104.

It should be noted that "equal" described in the embodiments of the present disclosure refers to a strict angular consistency, while "approximately equal" refers to an approximate angular consistency, including the stated value and an average value within an acceptable deviation range of a specified value. The acceptable deviation range is determined by those skilled in the art taking into account process preparation errors or measurement-related errors. For example, the error ranges from 0% to 5%. In the present disclosure, a predetermined arc transition surface may be formed between the first part 101 and the second part 102, which can be adjusted based on application scenarios during specific applications.

In the embodiments of the present disclosure, the cover portion 105 includes the first part 101 and the fourth part 104 that are coplanar and formed after bending the first plate body 110. The cover body portion 105 can be configured to fix the second plate body 120 on the one hand, and can be used as a sealing cover for the second flow channel 40 on the other hand. The second flow channel 40 is formed by the cover body portion 105 and a recessed portion (a third flow sub-channel 213) defined at the second plate body 120. In the embodiments of the present disclosure, the cover body portion 105 has a planar shape, which can facilitate fixation, mounting, or the like for the liquid cooling plate and the battery cell. However, the present disclosure is not limited in this regard. In different embodiments, the cover body portion 105 may also have the recessed portion to further define a shape of the second flow channel 40.

In the present disclosure, before the first plate body 110 is in an unbent state, the first plate body 110 includes a first side surface 111 and a second side surface 112 that are arranged opposite to each other. After the first plate body 110 is in a bent state, the second part 102 is located at a same height as the third part 103. A second side surface 112 of the second part 102 and a second side surface 112 of the third part 103 are arranged adjacent to each other. A first side surface 111 of the second part 102 and the second side surface 112 of the third part 103 are arranged opposite to each other. The first part 101 and the fourth part 104 are located at a same horizontal side surface and form the cover body portion 105 of the second liquid cooling portion 20. A first side surface 111 of the first part 101 is aligned with a first side surface 111 of the fourth part 104. A second side surface 112 of the first part 101 is aligned with a second side surface 112 of the fourth part 104. The first part 101 has a same width as the fourth part 104.

It should be understood that, due to a limitation of a thickness of the first plate body 110, the second side surfaces 112 cannot be completely attached to each other at individual bending positions, and thus gaps still exist at some positions. In the embodiments of the present disclosure, the first plate body 110 includes a first bent portion 113 between the first part 101 and the second part 102, a second bent portion 114 between the second part 102 and the third part 103, and a third bent portion 115 between the third part 103 and the fourth part 104. When the first flow channel 30 is defined, a predetermined distance is formed between the first flow channel 30 and each of the first bent portion 113, the second bent portion 114, and the third bent portion 115 to prevent problems such as a liquid leakage.

Further, in the embodiments of the present disclosure, the second part 102 and the third part 103 are sealingly connected through welding. In the present disclosure, a welding process is adopted to weld the second part 102 and the third part 103, such that fixation of the second part 102 and the third part 103 is realized on the one hand, and sealing between the second part 102 and the third part 103 is realized on the other hand. That is, the first flow channel 30 is sealed to prevent a fluid leakage. The welding process may be implemented in manners such as laser welding and friction stir welding. Welding positions may be set at a first region between the first flow channel 30 and the first bent portion 113, a second region between the first flow channel 30 and the second bent portion 114, and a third region between the first flow channel 30 and the third bent portion 115. In other embodiments of the present disclosure, other sealing manners may be adopted, such as a manner of using a sealant. The present disclosure is not limited in this regard.

Figure 3:
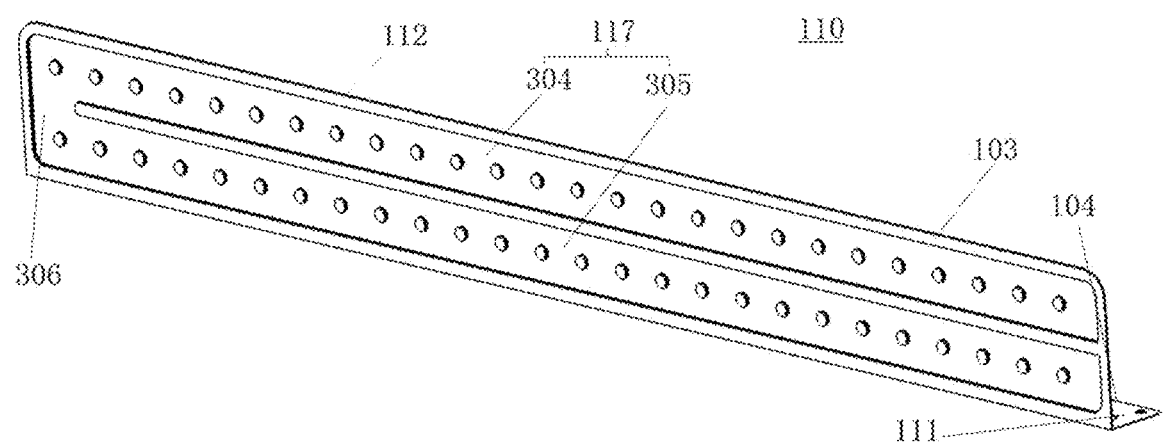
FIG. 3 is a sectional view taken along line A-A in FIG. 2.
Figure 4:
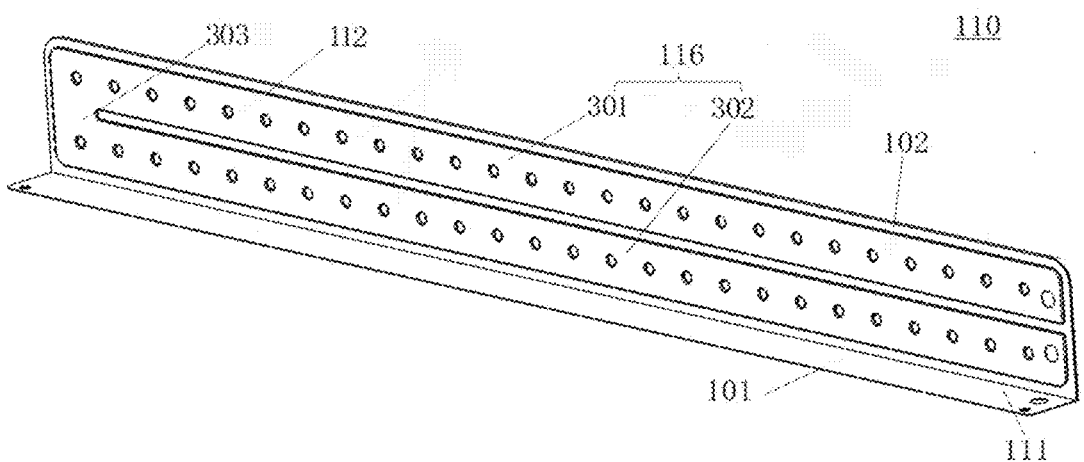
FIG. 4 is another sectional view taken along line A-A in FIG. 2.

In some embodiments of the present disclosure, as illustrated in FIG. 3 and FIG. 4, the second part 102 has a first flow sub-channel 116. The third part 103 has a second flow sub-channel 117. The first flow sub-channel 116 and the second flow sub-channel 117 are arranged opposite to each other to form the first flow channel 30.

At the first liquid cooling portion 10, the first flow channel 30 includes a first straight segment 310 and a second straight segment 320 that are arranged in parallel. The first straight segment 310 is in communication with the second straight segment 320 at an end of the first straight segment 310 and an end of the second straight segment 320 through a first detour segment 330. The other end of the first straight segment 310 is disconnected from the other end of the second straight segment 320. The other end of the first straight segment 310 has a first port 50. The other end of the second straight segment 320 has a second port 60.

It should be noted that, in the present disclosure, the first direction is defined as a width direction of the second liquid cooling portion 20, a second direction is defined as a length direction of the first liquid cooling portion 10 and the second liquid cooling portion 20, and a third direction is defined as a height direction of the first liquid cooling portion 10. Each of the first straight segment 310 and the second straight segment 320 extends in the second direction. The second direction is perpendicular to the first direction in a horizontal plane. The first part 101 and the fourth part 104 are disposed at both sides of the first liquid cooling portion 10 in the first direction, respectively.

In an exemplary embodiment of the present disclosure, the first flow sub-channel 116 includes a first sub-channel 301 and a second sub-channel 302 that are arranged in parallel and a first detour sub-channel 303 between the first sub-channel 301 and the second sub-channel 302. The first flow sub-channel 116 at the second part 102 includes a first sub-channel 301 and a second sub-channel 302 that are arranged in parallel and the first detour sub-channel 303 between the first sub-channel 301 and the second sub-channel 302. The second flow sub-channel 117 includes a third sub-channel 304 and a fourth sub-channel 305 that are arranged in parallel and a second detour sub-channel 306 between the third sub-channel 304 and the fourth sub-channel 305. When the first liquid cooling portion 10 is formed, the first sub-channel 301 and the third sub-channel 304 are symmetrically arranged with respect to the second side surface 112 of the second part 102. In addition, the first straight segment 310 is formed by the first sub-channel 301 and the third sub-channel 304 after the second part 102 and the third part 103 are sealed. The second sub-channel 302 and the fourth sub-channel 305 are symmetrically arranged with respect to the second side surface 112 of the second part 102. In addition, the second straight segment 320 is formed by the second sub-channel 302 and the fourth sub-channel 305 after the second part 102 and the third part 103 are sealed. The first detour sub-channel 303 and the second detour sub-channel 306 are symmetrically arranged with respect to the second side surface 112 of the second part 102. In addition, the first detour segment 330 is formed by the first detour sub-channel 303 and the second detour sub-channel 306 after the second part 102 and the third part 103 are sealed.

In another exemplary embodiment of the present disclosure, the first flow sub-channel 116 and the second flow sub-channel 117 are formed through stamping. In addition, when the first plate body 110 is in the unbent state, a stamping protrusion of the first flow sub-channel 116 and a stamping protrusion of the second flow sub-channel 117 are oriented in a same stamping direction. Exemplarily, in the present disclosure, the first flow sub-channel 116 and the second flow sub-channel 117 are stamped from the second side surface 112 to the first side surface 111, and are then oriented in opposite stamping directions after being bent by 180 degrees.

Figure 5:
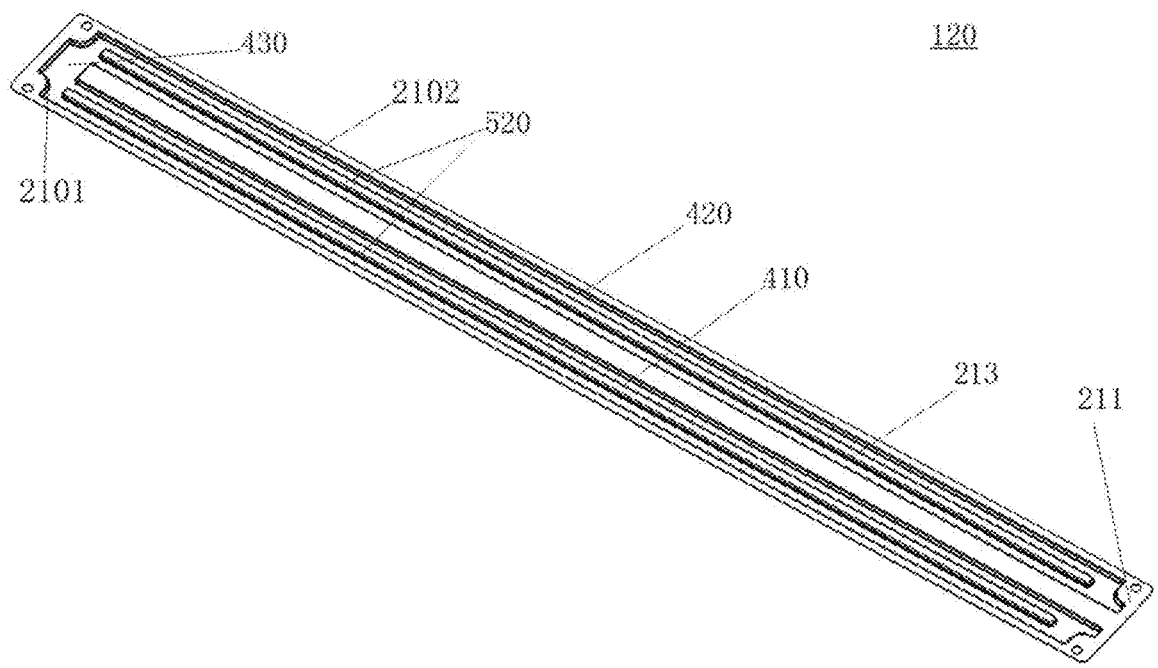
FIG. 5 is a schematic view of a structure of a second plate body according to an embodiment of the present disclosure.

Similarly, as illustrated in FIG. 5, the second plate body 120 has a third flow sub-channel 213 formed through stamping. The third flow sub-channel 213 includes a groove surface 2101 and a bottom surface 2102. The bottom surface 2102 protrudes in a direction away from a side of the cover body portion 105. The second flow channel 40 is defined by the third flow sub-channel 213 and the cover body portion 105.

Figure 6:
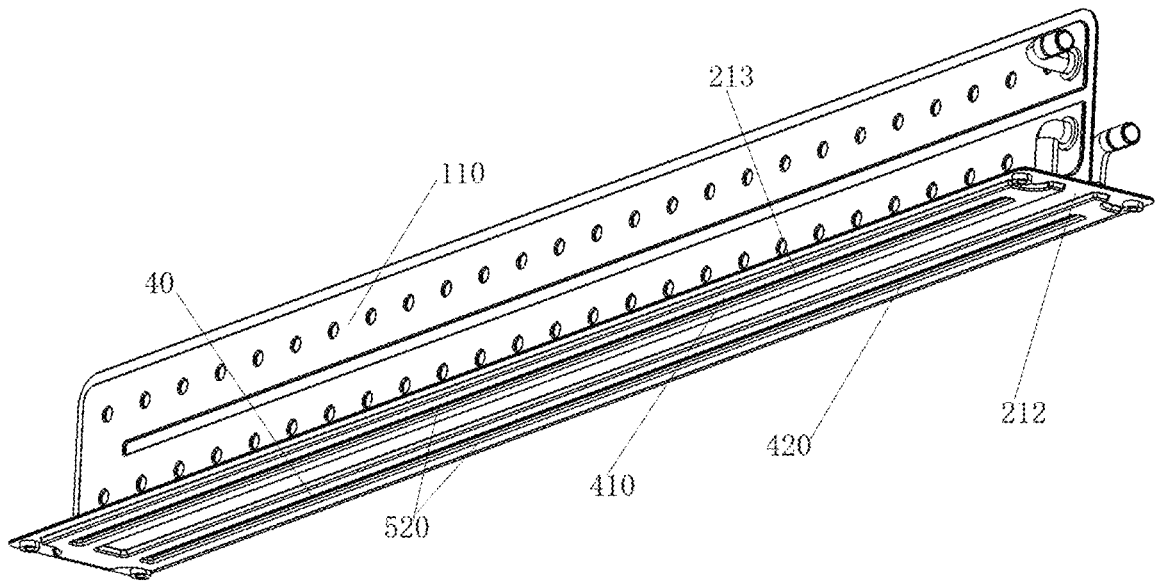
FIG. 6 is a schematic assembly view of a first plate body and a second plate body according to an embodiment of the present disclosure.

The second flow channel 40 includes a third straight segment 410 and a fourth straight segment 420 that are arranged in parallel. The third straight segment 410 is in communication with the fourth straight segment 420 at an end of the third straight segment 410 and an end of the fourth straight segment 420 through a second detour segment 430. The other end of the third straight segment 410 is disconnected from the other end of the fourth straight segment 420. The third straight segment 410 is in communication with a third port 70 at the other end of the third straight segment 410. The fourth straight segment 420 is in communication with a fourth port 80 at the other end of the fourth straight segment 420. The third straight segment 410, the fourth straight segment 420, and the second detour segment 430 are set in a manner similar to that of the first straight segment 310, the second straight segment 320, and the first detour segment 330. It should be noted that, as illustrated in FIG. 5 and FIG. 6, the second plate body 120 includes a first surface 211 and a second surface 212 that are arranged opposite to each other. The first surface 211 is adjacent to the second surface 202 of the first plate body 110. A stamping direction of the third flow sub-channel 213 is oriented from the first surface 211 to the second surface 212. In the present disclosure, the third straight segment 410 corresponds to the first part 101, and the fourth straight segment 420 corresponds to the fourth part 104. Since the first part 101 and the fourth part 104 are horizontal at the respective second surface 202, no stamping region is provided. Therefore, the second flow channel 40 is formed by sealing only the third flow sub-channel 213 at the second plate body 120 and the flat second side surface 112 (illustrated in FIG. 7) at the first plate body 110.

Figure 8:
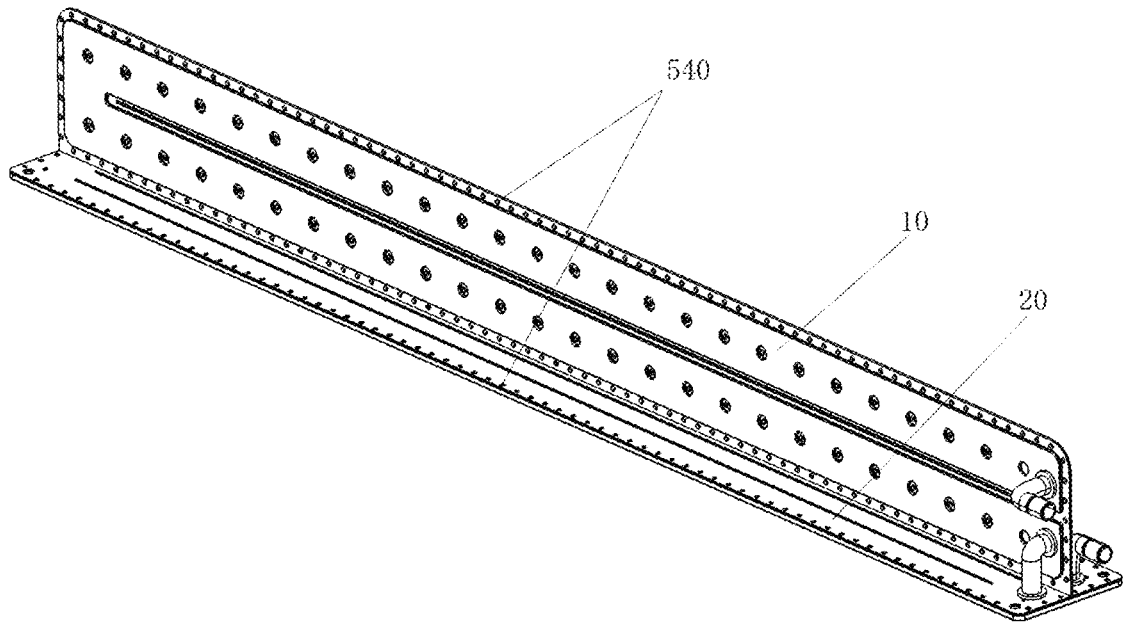
FIG. 8 is a schematic view of a structure of another liquid cooling plate according to an embodiment of the present disclosure.

In the embodiments of the present disclosure, sealing of the second flow channel 40 may also be realized through a welding process. The present disclosure is not limited in this regard. The present disclosure further provides a manner of realizing sealing using a holeless rivet 540, through which the first plate body 110 and the second plate body 120 and/or the third plate body 130 are sealingly connected. That is, holeless riveting is realized at edges of the first plate body 110, the second plate body 120 and the third plate body 130, such that parts of the plate bodies at connections can be tightly compressed to improve a sealing degree. In the embodiments of the present disclosure, a riveting position of the holeless rivet 540 is not limited. In some embodiments, the holeless rivet 540 may be riveted at positions of the first plate body 110 and the second plate body 120 corresponding to a thermal insulation passage 530 and a diversion groove 520. The second part 102 and the third part 103 can also be sealed or further sealed using the holeless rivet 540. As illustrated in FIG. 8, in other embodiments, the riveting position can be any position at a contact surface between the second plate body 120 and the third plate body 130, e.g., at a recess 510. The present disclosure is not limited in this regard.

In the present disclosure, the first liquid cooling portion 10 formed by the one-piece bending method can be sealed at edge positions of the first flow channel 30 through welding, riveting, etc., to avoid a plugging method adopted in some conventional designs, reducing a risk of liquid leakage.

It should be further clarified that, in the present disclosure, as an example of description, the first flow channel 30 includes two straight segments. In different embodiments, to improve a heat exchange efficiency, more straight segments may be provided to form a serpentine channel. A specific shape of the first flow channel 30 and a specific shape of the second flow channel 40 are not limited in the present disclosure. In other embodiments of the present disclosure, each of the first flow channel 30 and the second flow channel 40 may be formed in a curved shape, an S shape, or the like.

Figure 7:
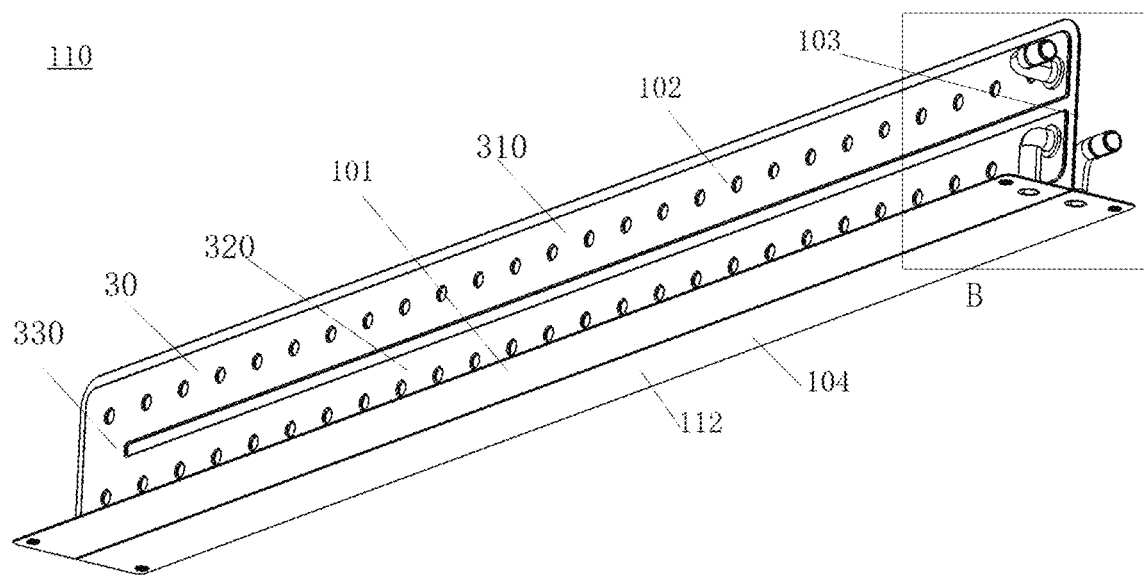
FIG. 7 is a schematic view of a structure of a second flow channel according to an embodiment of the present disclosure.
Figure 10:
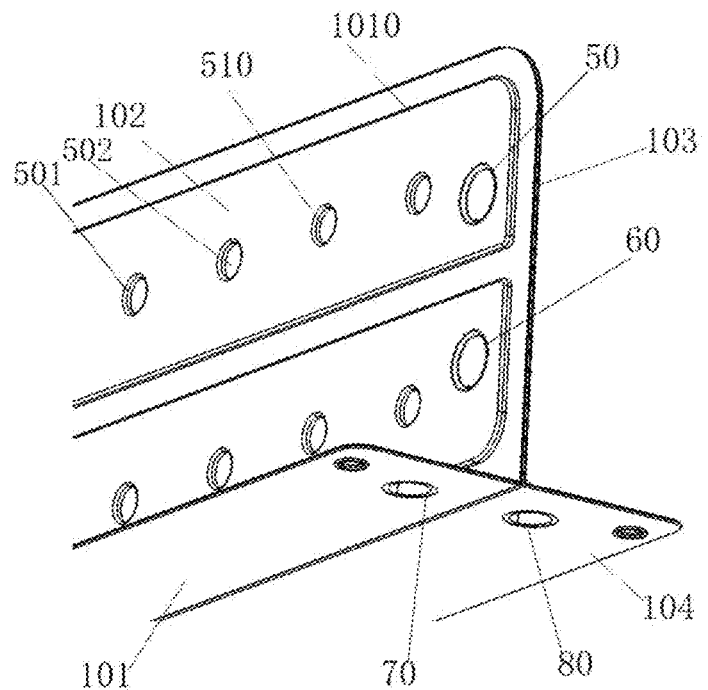
FIG. 10 is a schematic view of the structure shown in FIG. 7 with an external pipe, a liquid inlet pipe, and a liquid outlet pipe being removed.

In the embodiments of the present disclosure, the first flow channel 30 is connected to the second flow channel 40 by a connection pipe disposed outside a flow channel. As illustrated in FIG. 7 and FIG. 10, the first port 50 is disposed at the second part 102 and/or the third part 103, and the second port 60 is disposed at the second part 102 and/or the third part 103. It should be understood that positions of the first port 50 and the second port 60 are not limited in the present disclosure. The first port 50 and the second port 60 may be disposed at a same part or at different parts. In the present disclosure, as an example of description, each of the first port 50 and the second port 60 is disposed at the second part 102.

In an exemplary embodiment of the present disclosure, the first part 101 has the third port 70 in communication with the second flow channel 40. The fourth part 104 has a fourth port 80 in communication with the second flow channel 40. The second straight segment 320 is disposed below the first straight segment 310 at a side of the first straight segment 310 close to the first part 101, the first port 50 is a liquid inlet. The second port 60 is connected to, through an external pipe 90, one of the third port 70 and the fourth port 80 that is disposed at a same side as the second port 60. The other one of the third port 70 and the fourth port 80 is a liquid outlet. For example, the third port 70 and the second port 60 are located at a same side of the first liquid cooling portion 10. The third port 70 and the second port 60 are connected by the external pipe 90. The first port 50 is the liquid inlet to which a liquid inlet pipe 1010 is connected. The fourth port 80 is the liquid outlet to which a liquid outlet pipe 1020 is connected.

In this embodiment, the external pipe 90, the liquid outlet pipe 1020, and the liquid inlet pipe 1010 may be fixed through welding, or insertion and connection for the external pipe 90, the liquid outlet pipe 1020, and the liquid inlet pipe 1010 may be realized using a metallic flexible pipe quick connector or a plastic flexible pipe quick connector. Comparatively speaking, a temperature of a medium in an inflow direction is relatively low, while the temperature of the medium in an outflow direction is relatively high after the medium absorbs heat emitted by the battery cell 200. In the present disclosure, with a liquid inlet disposed at the first liquid cooling portion 10 and a liquid outlet disposed at the second liquid cooling portion 20, a heat exchange rate of the first liquid cooling portion 10 can be improved. In addition, the temperature of the medium in the flow channel can be self-equalized inside the liquid cooling plate 100, realizing temperature uniformity of the entire liquid cooling plate 100.

Further, it should be noted that, based on the study of the battery, in a height direction of the battery, a thermal conductivity is high and heat transfer is fast, and a temperature distribution of the battery cell 200 is that the battery cell 200 has a relatively high temperature in a middle part and an upper part. In a case of a sufficient pressure in the flow channel, the flow channel can be ensured to be filled with a heat exchange medium regardless of whether a top-in and bottom-out method or a bottom-in and top-out method is adopted for the liquid cooling plate 100. However, the top-in and bottom-out method is more suitable for a small flow channel, enabling a cooling medium to flow through the upper part first. The bottom-in and top-out method is more suitable for a large flow channel as the large flow channel is able to increase the heat exchange efficiency. In practice, choices can be made based on scenes and the like.

In the present disclosure, the heat exchange medium is provided in the first flow channel 30 and the second flow channel 40. Heat is transferred through a phase change such as evaporation and condensation, movements, or the like. In the embodiments of the present disclosure, the cooling medium may be water or other refrigerants such as freon, ammonia, acetone, methanol, ethanol, heptane, etc., which is not limited in the present disclosure.

Figure 9:
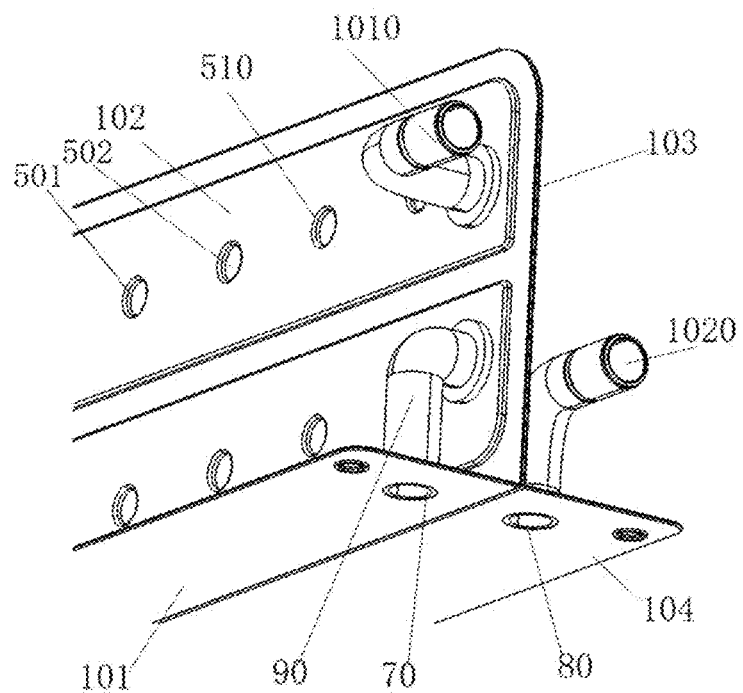
FIG. 9 is a schematic enlarged view of part B in FIG. 7.

In some embodiments, as illustrated in FIG. 8 to FIG. 10, the first plate body 110 has a plurality of recesses 510 disposed in an array at the corresponding first straight segment 310 and the second straight segment 320. The plurality of recesses 510 is arranged in an extension direction (the second direction) of the first straight segment 310 or the second straight segment 320. Each of the plurality of recesses 510 includes a recess wall 501 and a recess bottom 502. The recess bottom 502 protrudes from the first plate body 110 towards the first flow channel 30.

It should be understood that shapes and a quantity of the recesses 510 are not limited in the embodiments of the present disclosure. A cross section of the recess 510 parallel to the first side surface 111 may have a circular shape, an elliptical shape, a triangular shape, a quadrilateral shape, or the like. The quantity of the recesses 510 may be determined based on an extension length of the second straight segment 320. At a position where the heat exchange medium flows through the recess 510, a water flow is divided into two streams to prevent a situation where the water flow is static in the straight segment, and the recess 510 provides flow guidance. As a part of a solid wall surface of the first liquid cooling portion 10, the recess 510 can also enlarge a contact area between the heat exchange medium and an inner wall of the first flow channel 30, further improving a cooling effect. In addition, the recess 510 can also reinforce structural strength by a predetermined degree to avoid a risk of a flow channel failure or a flow channel fracture due to uneven stress, stress concentration, or the like.

Figure 11:
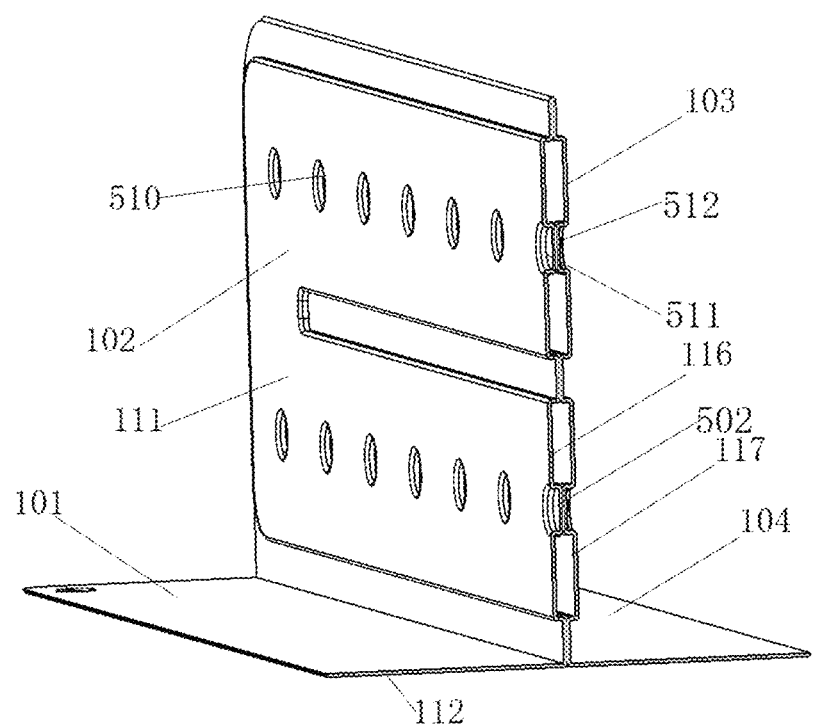
FIG. 11 is a schematic sectional view of a liquid cooling plate at a recess according to an embodiment of the present disclosure.

In the present disclosure, as illustrated in FIG. 11, the recess 510 is formed at each of the second part 102 and the third part 103. A gap is formed between the recess bottom 502 of the recess 510 (a first recess 511) at the second part 102 and the recess bottom 502 of the recess 510 (a second recess 512) at the third part 103 after the first plate body 110 is bent to form the first liquid cooling portion 10.

The recess 510 is formed through stamping. A stamping direction of the recess 510 is opposite to a stamping direction of the first flow sub-channel 116 or a stamping direction of the second flow sub-channel 117. The recess 510 has a smaller stamping height than the first flow sub-channel 116 and the second flow sub-channel 117. For example, in the present disclosure, the first flow sub-channel 116 and the second flow sub-channel 117 are stamped from the second side surface 112 to the first side surface 111. The stamping direction of the recess 510 is oriented in a direction from the first side surface 111 to the second side surface 112.

In the present disclosure, with the recess 510 having the smaller stamping height than the first flow sub-channel 116 and the second flow sub-channel 117, a gap is formed between the recess 510 at the second part 102 and the recess 510 at the third part 103 after the first flow channel 30 is formed. With the gap between the corresponding recesses 510 at two sides, the heat exchange medium passes through the gap. The heat exchange medium is divided into two streams of water flow when passing through the recess 510. With the gap, a direction of a turbulent flow is slightly inclined towards an upper side and a lower side of the recess 510 during flowing of the water flow. In addition, a flow speed of the water flow divided by the recess 510 can be increased. That is, after the heat exchange medium is in contact with the recess 510, two streams of water flow rushing to the upper and lower sides of the recess 510 at a high flow speed can be formed in a very short time, which can improve a contact efficiency between an inner wall of the plate body above the recess 510 and the heat exchange medium, improving a liquid cooling effect of the entire vertical liquid cooling plate 100.

In other embodiments, as illustrated in FIG. 5 and FIG. 6, the third flow sub-channel 213 has at least one diversion groove 520 defined in each of the corresponding third straight segment 410 and the corresponding fourth straight segment 420. The diversion groove 520 is arranged in an extension direction of the third straight segment 410 or an extension direction of the fourth straight segment 420 and formed through stamping. A stamping direction of the diversion groove 520 is opposite to a stamping direction of the third flow sub-channel 213, that is, stamped from the first surface 211 to the second surface 212. A spacing is defined between each of two ends of the diversion groove 520 and the groove surface of the third flow sub-channel 213. In the embodiments of the present disclosure, a shape and a size of the diversion groove 520 are not limited. In some embodiments, a plurality of diversion grooves 520 may be formed in an extension direction (the second direction) of the third straight segment 410. In other embodiments of the present disclosure, the plurality of diversion grooves 520 may be arranged in parallel in a direction (the first direction) perpendicular to the extension direction of the third straight segment 410. An arrangement manner of the plurality of diversion grooves 520 is not limited in the present disclosure.

In the present disclosure, when the heat exchange medium in the second flow channel 40 flows, the diversion groove 520 can divide the water flow in the third straight segment 410 or the fourth straight segment 420 into two streams to prevent the situation where the water flow is static in the straight segment and provides flow guidance. As a part of a solid wall surface of the second liquid cooling portion 20, the diversion groove 520 can also enlarge a contact area between the heat exchange medium and an inner wall of the second flow channel 40, further improving the cooling effect. In addition, the diversion groove 520 can also reinforce the structural strength by the predetermined degree to avoid the risk of the flow channel failure or the flow channel fracture due to uneven stress, stress concentration, or the like. Reference to an arrangement manner of the diversion groove 520 in the present disclosure can be made to an arrangement manner of the recess 510, and thus details thereof will be omitted here.

Figure 12:
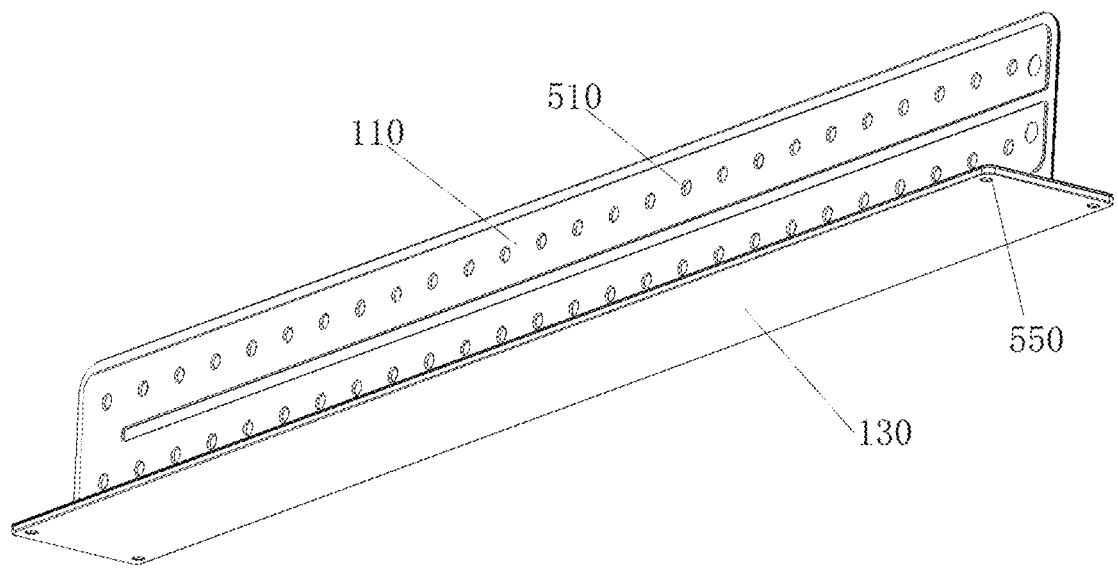
FIG. 12 is a schematic view of a structure of yet another liquid cooling plate according to an embodiment of the present disclosure.
Figure 13:
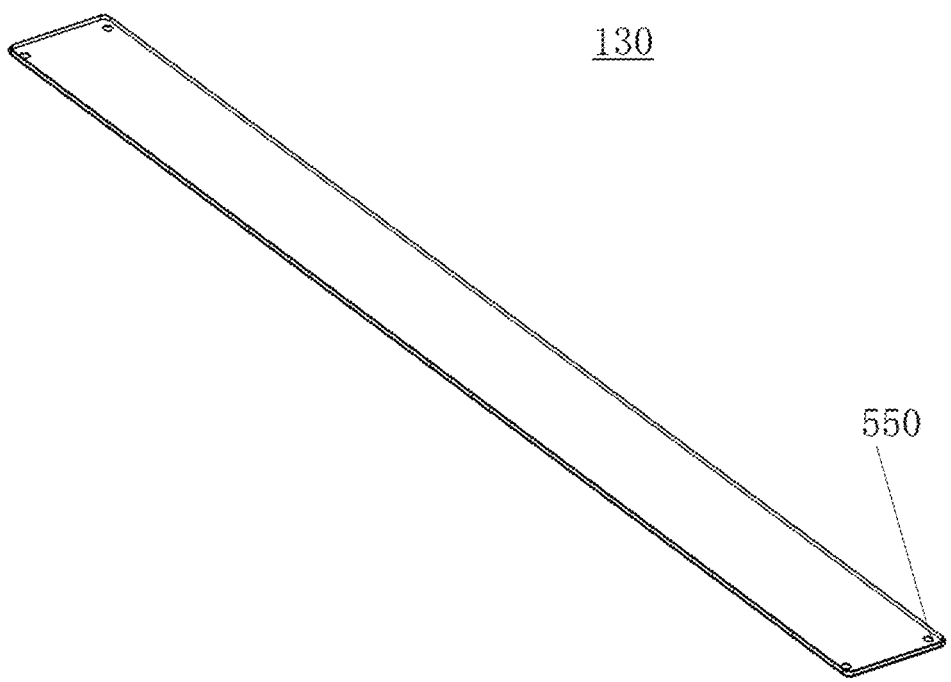
FIG. 13 is a schematic view of a structure of a third plate body according to an embodiment of the present disclosure.
Figure 14:
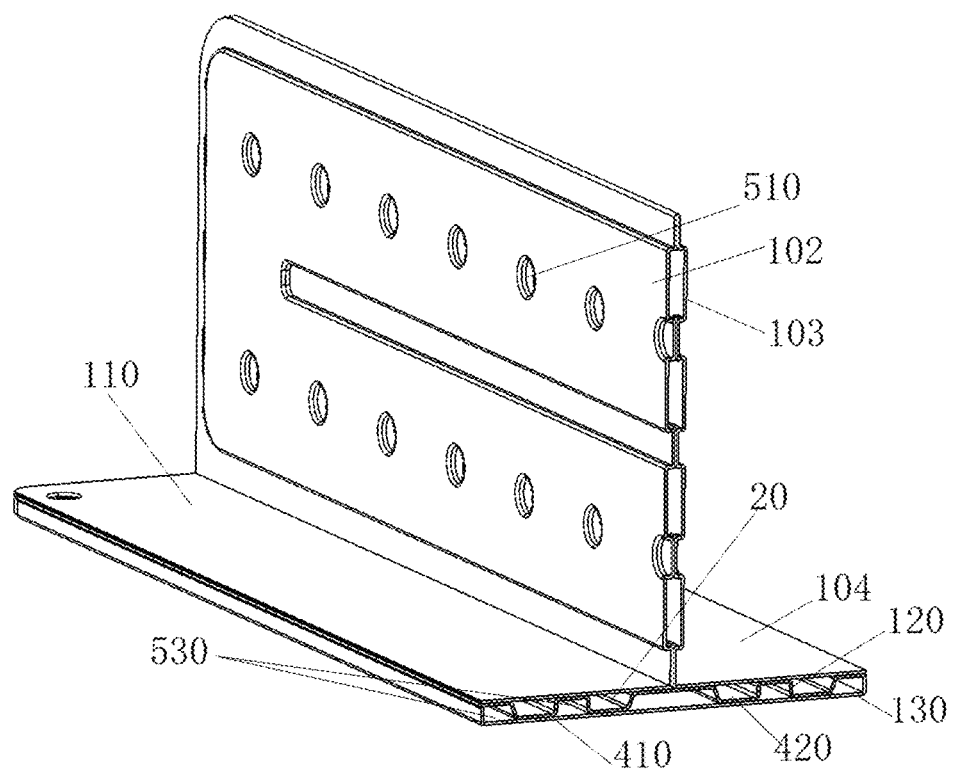
FIG. 14 is a schematic sectional view of a liquid cooling plate according to an embodiment of the present disclosure.

As illustrated in FIG. 12 to FIG. 14, the liquid cooling plate 100 in the present disclosure further includes a third plate body 130 disposed at a side of the second liquid cooling portion 20 away from the cover body portion 105. The third plate body 130 is fixedly connected to the first plate body 110 and/or the second plate body 120. The third plate body 130 has a one-piece structure. A sealing cavity is defined between the third plate body 130 and the second plate body 120 and filled with a thermal insulation material.

In the present disclosure, the third plate body 130 is disposed at a side of the second surface 212 of the second plate body 120, and forms the second liquid cooling portion 20 together with both the cover body portion 105 formed through bending the first plate body 110 and the second plate body 120. An accommodation space is formed by stamping the third plate body 130. The second plate body 120 is placed in the accommodation space. A part of the second surface 212 of the second plate body 120 forming the second flow channel 40 is in contact with a bottom surface of the accommodation space. The thermal insulation passage 530 is formed between a part of the second surface 212 of the second plate body 120 not participating in forming the second flow channel 40 and the accommodation space. The thermal insulation material is provided in the thermal insulation passage 530. For example, the thermal insulation material may be filled in a region such as a region at a side of the third straight segment 410 away from the fourth straight segment 420, a region between the third straight segment 410 and the fourth straight segment 420, and a region at a side of the fourth straight segment 420 away from the third straight segment 410. The present disclosure is not limited in this regard. The thermal insulation material may be polyurethane, polystyrene material, rock wool, glass, or the like, which can save space to improve a space utilization rate, improve mechanical performance of the liquid cooling plate 100, and achieve a function of thermal insulation and heat insulation.

In the present disclosure, the first plate body 110 and the second plate body 120 are in face-to-face contact at positions corresponding to the thermal insulation passage 530. In the present disclosure, the first plate body 110 and the second plate body 120 may be sealingly connected at the positions corresponding to the thermal insulation passage 530 to prevent the heat exchange medium in a second channel from entering the thermal insulation passage 530 through the faces. The sealing manner is not limited in the present disclosure, which may be holeless riveting, welding, sealing using a sealant, or the like.

Figure 15:
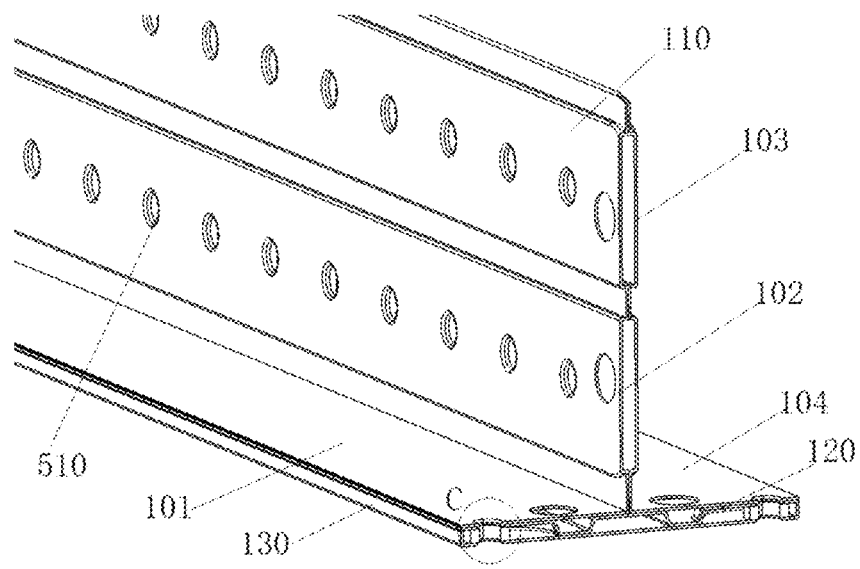
FIG. 15 is another schematic sectional view of a liquid cooling plate according to an embodiment of the present disclosure.
Figure 16:
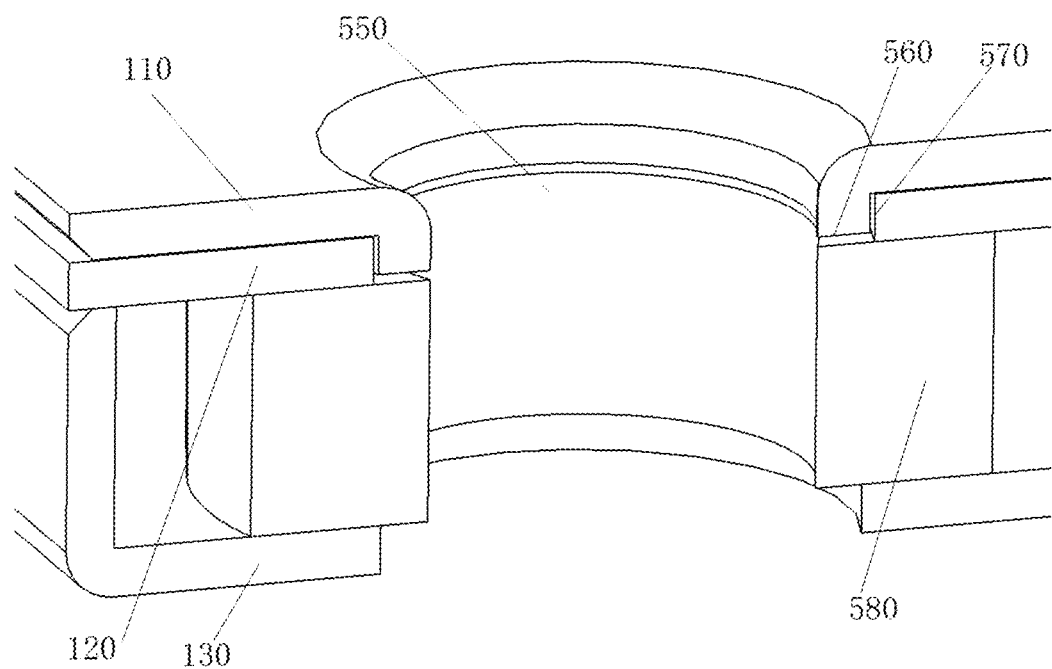
FIG. 16 is a schematic enlarged view of part C in FIG. 13.

In addition, as illustrated in FIG. 15 and FIG. 16, the liquid cooling plate 100 has a fixation hole 550 penetrating the second liquid cooling portion 20. A fixed connection between the liquid cooling plate 100 and an external structure can be realized through the fixation hole 550. A position of the fixation hole 550 is not limited in the present disclosure.

In another exemplary embodiment of the present disclosure, the fixation hole 550 is formed at an outer side of the second flow channel 40. Each of the first part 101 and the fourth part 104 has a sealing portion 560 configured to form the fixation hole 550. The sealing portion 560 extends towards a side close to the second plate body 120. The second plate body 120 has a passage hole 570 for passage of the sealing portion 560.

A seal 580 is further disposed between the second plate body 120 and the third plate body 130 and configured to seal the fixation hole 550. The seal 580 has an outer diameter greater than a diameter of the fixation hole 550 at the third plate body 130.

In the present disclosure, in a third direction, the fixation hole 550 includes a first through hole part formed at the sealing portion 560, a part of a second through hole part formed at the second plate body 120, a third through hole part formed at the seal 580, and a fourth through hole part formed at the third plate body 130.

The sealing portion 560 is formed by stamping the first plate body 110 in a direction from the first side surface 111 to the second side surface 112 and protrudes from the second side surface 112 of the first plate body 110. The first through hole is formed at a center of the sealing portion 560. After the first plate body 110 and the second plate body 120 are fixed, the sealing portion 560 extends into the passage hole 570 at the second plate body 120. It should be understood that a size of the sealing portion 560 and a size of the passage hole 570 are not limited in the embodiments of the present disclosure, as long as mounting can be facilitated. The sealing portion 560 does not extend beyond the second surface 212 of the second plate body 120.

With the seal 580 disposed between the second plate body 120 and the third plate body 130, i.e., the seal 580 is disposed in the accommodation space, an end of the seal 580 may be fixed to the second plate body 120, while the other end of the seal 580 may be fixed to the third plate body 130. The seal 580 has the outer diameter greater than the diameter of the fixation hole 550 at the third plate body 130. The outer diameter of the seal 580 is further greater than an inner diameter of the sealing portion 560 at the third plate body 130, such that sealing at a position of the fixation hole 550 can be realized to prevent the liquid leakage.

Figure 17:
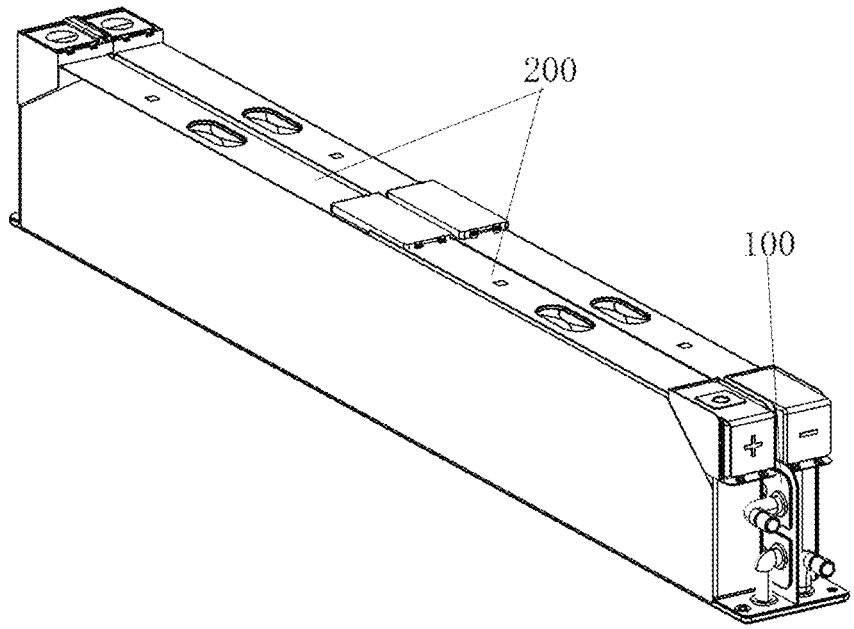
FIG. 17 is a schematic view of a structure of a battery module according to an embodiment of the present disclosure.
Figure 18:
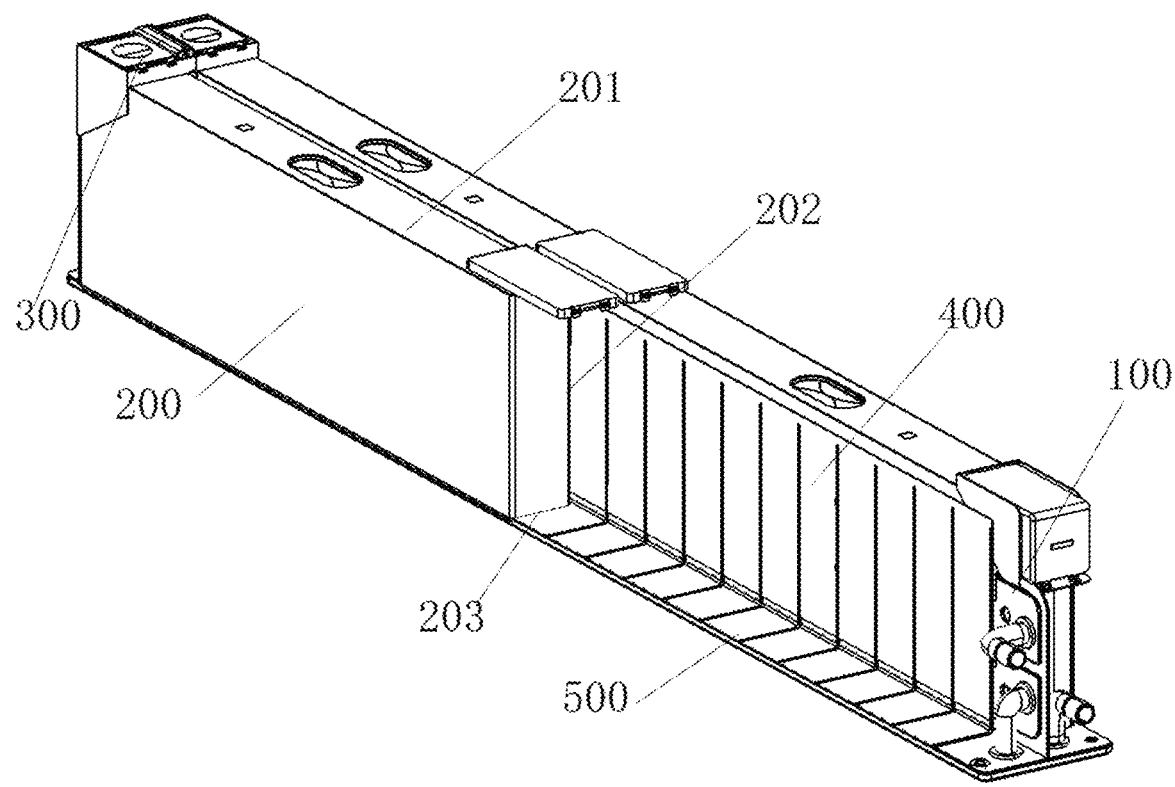
FIG. 18 is a schematic view of a structure of a battery module with some battery cells removed according to an embodiment of the present disclosure.

Based on a same invention concept, as illustrated in FIG. 17 and FIG. 18, the present disclosure provides a battery module including at least two battery modules. Each of at least two battery modules includes at least one battery cell 200. The liquid cooling plate 100 according to any of the above embodiments is disposed between two adjacent battery modules.

The battery module in this embodiment includes, but is not limited to, the battery cell 200 in a form of a cuboid. Also, a quantity of the battery cells 200 in the battery module is not limited. The quantity of the battery cells 200 may be two, four, or more. The battery module is formed by sequentially arranging the battery cells 200. Two adjacent battery modules are disposed at two sides of the liquid cooling plate 100. In practice, choices can be made based on scenes and the like.

In another exemplary embodiment of the present disclosure, the battery cell 200 includes a first surface 201, a second surface 202, and a third surface 203 that are pairwise perpendicular to each other. The first surface 201 is provided with a connector configured to electrically connect two adjacent battery cells 200. The third surface 203 is arranged opposite to the first surface 201. The first surface 201 has a smaller area than the second surface 202. The second surface 202 is in contact with the first liquid cooling portion 10 through a first heat conduction pad 400, and/or the third surface 203 is in contact with the second liquid cooling portion 20 through a second heat conduction pad 500.

In the present disclosure, a large surface of the battery cell 200 may be in contact with the first liquid cooling portion 10, while a small surface of the battery cell 200 may be in contact with the second liquid cooling portion 20, to realize a uniform heat exchange of the battery cell 200, avoiding a problem of a high local temperature of the battery cell 200 due to a poor contact between the liquid cooling plate 100 and the battery cell. Therefore, service lives of the plurality of battery cells 200 can be prolonged. In addition, thermal management performance of the battery cells 200 can be improved to enable a relatively high consistency of the battery module in use, in such a manner that a thermal runaway can be avoided to ensure safety of the battery cell 200. The heat conduction pad is adhered on the first surface 201 of the first plate body 110. The battery cell 200 is in contact with the liquid cooling plate 100 through the heat conduction pad, which can improve a heat transfer efficiency between the liquid cooling plate 100 and the battery, and further improve the heat exchange efficiency.

In the description of the present disclosure, it should be understood that, the orientation or the position indicated by terms such as "length", "width", "over", "below", "front", "rear", "left", "right", "vertical", "horizontal", "top", "bottom", "inner", and "outer" should be construed to refer to the orientation and the position as shown in the drawings, and is only for the convenience of describing the present disclosure and simplifying the description, rather than indicating or implying that the pointed device or element must have a specific orientation, or be constructed and operated in a specific orientation, and therefore cannot be understood as a limitation of the present disclosure.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features or more of the features. In the description of the present disclosure, "plurality" means at least two, unless otherwise specifically defined.

Unless otherwise defined, technical and scientific terms used herein have the same meaning as is commonly understood by those skilled in the art of this disclosure. The terms used herein are for the purpose of describing particular implementations only and are not intended to limit the present disclosure. Terms such as "provide" throughout this specification may mean that one member is attached to another member either directly or through an intermediate member. Throughout this specification, a feature described in one embodiment may be applied in another embodiment alone or in combination with other features, unless the feature is inapplicable in the other embodiment or otherwise indicated.

The present disclosure has been described by way of the above embodiments, but it should be understood that the above embodiments are for purposes of giving examples and illustration only and are not intended to limit the present disclosure to a scope of the described embodiments. It is conceivable for those skilled in the art that more variations and modifications can be made in accordance with the teachings of the present disclosure. These variations and modifications fall within the protect scope of the present disclosure.

What is claimed is:

1. A liquid cooling plate, having a first liquid cooling portion and a second liquid cooling portion that are perpendicular to each other, the first liquid cooling portion being located at a middle position of the second liquid cooling portion in a first direction, the liquid cooling plate comprising:
   a first plate body having a one-piece structure, the first plate body comprising the first liquid cooling portion and a cover body portion of the second liquid cooling portion, the first plate body having a first flow channel of the first liquid cooling portion, the first plate body comprising a first part, a second part, a third part, and a fourth part that are bent consecutively, wherein the second part and the third part are arranged opposite to each other to form the first liquid cooling portion, the cover body portion is formed by the first part and the fourth part, the first part has an end connected to an end of the fourth part, the first part and the fourth part extend in opposite directions from the respective ends connected to each other;
   a second plate body having a one-piece structure and being fixedly connected to the cover body portion, a second flow channel of the second liquid cooling portion being defined between the second plate body and the cover body portion, wherein the first flow channel is in communication with the second flow channel, and wherein the second plate body has a third flow sub-channel formed through stamping, the third flow sub-channel comprising a groove surface and a bottom surface, the bottom surface protruding in a direction away from a side of the cover body portion, and the second flow channel being defined by the third flow sub-channel and the cover body portion; and a third plate body disposed at a side of the second plate body away from the cover body portion, the bottom surface of the third flow sub-channel being in contact with the third plate body, a thermal insulation passage being formed between the third plate body and a part, on which no second flow channel is formed, of the second plate body, and the thermal insulation passage being filled with a thermal insulation material, wherein:

the first plate body and the second plate body are in face-to-face contact and sealingly connected to each other at positions corresponding to the thermal insulation passage;

the liquid cooling plate has a fixation hole penetrating the second liquid cooling portion and formed at the second flow channel, wherein:

each of the first part and the fourth part has a sealing portion configured to form the fixation hole, the sealing portion extending towards a side close to the second plate body, and the second plate body having a passage hole for passage of the sealing portion; and a seal is further disposed between the second plate body and the third plate body and configured to seal the fixation hole, the seal having an outer diameter greater than a diameter of the fixation hole at the third plate body.

2. The liquid cooling plate according to claim 1, wherein:
the second part has a first flow sub-channel;
the third part has a second flow sub-channel; and
the first flow sub-channel and the second flow sub-channel are arranged opposite to each other to form the first flow channel.

3. The liquid cooling plate according to claim 2, wherein, the first flow channel comprises a first straight segment and a second straight segment that are arranged in parallel, the first straight segment being in communication with the second straight segment at an end of the first straight segment and an end of the second straight segment through a first detour segment, the other end of the first straight segment being disconnected from the other end of the second straight segment, the other end of the first straight segment having a first port, and the other end of the second straight segment having a second port;

the first part has a third port in communication with the second flow channel, and the fourth part has a fourth port in communication with the second flow channel;

the second straight segment is disposed below the first straight segment at a side of the first straight segment close to the first part, the first port is a liquid inlet, the second port is connected to one of the third port and the fourth port disposed at a same side as the second port through an external pipe, and the other one of the third port and the fourth port is a liquid outlet; and the second flow channel comprises a third straight segment and a fourth straight segment that are arranged in parallel, the third straight segment being in communication with the fourth straight segment at an end of the third straight segment and an end of the fourth straight segment through a second detour segment, the other end of the third straight segment being disconnected from the other end of the fourth straight segment, the third straight segment being in communication with the third port at the other end of the third straight segment, and the fourth straight segment being in communication with the fourth port at the other end of the fourth straight segment.

4. The liquid cooling plate according to claim 2, wherein:
the first flow sub-channel and the second flow sub-channel are formed through stamping; and
when the first plate body is in an unbent state, a stamping protrusion of the first flow sub-channel and a stamping protrusion of the second flow sub-channel are oriented in a same stamping direction.

5. The liquid cooling plate according to claim 3, wherein the first plate body has a plurality of recesses disposed in an array at the corresponding first straight segment and the second straight segment, the plurality of recesses being arranged in an extension direction of the first straight segment or the second straight segment, and each of the plurality of recesses comprising a recess wall, and a recess bottom protruding from the first plate body towards the first flow channel.

6. The liquid cooling plate according to claim 5, wherein the recess is formed at each of the second part and the third part, a gap being formed between the recess bottom of the recess at the second part and the recess bottom of the recess at the third part after the first plate body is bent to form the first liquid cooling portion.

7. The liquid cooling plate according to claim 6, wherein the recess is formed through stamping, a stamping direction of the recess being opposite to a stamping direction of the first flow sub-channel or a stamping direction of the second flow sub-channel, and the recess having a smaller stamping height than the first flow sub-channel and the second flow sub-channel.

8. The liquid cooling plate according to claim 3, wherein the third flow sub-channel has at least one diversion groove arranged in an extension direction of the third straight segment or an extension direction of the fourth straight segment and formed through stamping, a stamping direction of the diversion groove being opposite to a stamping direction of the third flow sub-channel, and a spacing being defined between each of two ends of the diversion groove and the groove surface of the third flow sub-channel.

9. The liquid cooling plate according to claim 1, wherein the third plate body has a one-piece structure, the third plate body being fixedly connected to the first plate body and/or the second plate body.

10. A battery module, comprising:
at least two battery cells; and
a liquid cooling plate, having a first liquid cooling portion and a second liquid cooling portion that are perpendicular to each other, the first liquid cooling portion being located at a middle position of the second liquid cooling portion in a first direction, the liquid cooling plate comprising:
a first plate body having a one-piece structure, the first plate body comprising the first liquid cooling portion and a cover body portion of the second liquid cooling portion, the first plate body having a first flow channel of the first liquid cooling portion, the first plate body comprising a first part, a second part, a third part, and a fourth part that are bent consecutively, wherein the second part and the third part are arranged opposite to each other to form the first liquid cooling portion, the cover body portion is formed by the first part and the fourth part, the first part has an end connected to an end of the fourth part, the first part and the fourth part extend in opposite directions from respective ends connected to each other;

a second plate body having a one-piece structure and fixedly connected to the cover body portion, a second flow channel of the second liquid cooling portion being defined between the second plate body and the cover body portion, wherein the first flow channel is in communication with the second flow channel, and wherein the second plate body has a third flow sub-channel formed through stamping, the third flow sub-channel comprising a groove surface and a bottom surface, the bottom surface protruding in a direction away from a side of the cover body portion, and the second flow channel being defined by the third flow sub-channel and the cover body portion; and a third plate body disposed at a side of the second plate body away from the cover body portion, the bottom surface of the third flow sub-channel being in contact with the third plate body, a thermal insulation passage being formed between the third plate body and a part, on which no second flow channel is formed, of the second plate body, and the thermal insulation passage being filled with a thermal insulation material, wherein:

the first plate body and the second plate body are in face-to-face contact and sealingly connected to each other at positions corresponding to the thermal insulation passage;

the liquid cooling plate has a fixation hole penetrating the second liquid cooling portion and formed at the second flow channel, and wherein:

each of the first part and the fourth part has a sealing portion configured to form the fixation hole, the sealing portion extending towards a side close to the second plate body, and the second plate body having a passage hole for passage of the sealing portion; and a seal is further disposed between the second plate body and the third plate body and configured to seal the fixation hole, the seal having an outer diameter greater than a diameter of the fixation hole at the third plate body.

11. The battery module according to claim 10, wherein:
each of the at least two battery cells comprises a first surface, a second surface, and a third surface that are pairwise perpendicular to each other;
the first surface is provided with a connector configured to electrically connect two adjacent battery cells of the at least two battery cells;
the third surface is arranged opposite to the first surface;
the first surface has a smaller area than the second surface; and
the second surface is in contact with the first liquid cooling portion through a first heat conduction pad, and/or the third surface is in contact with the second liquid cooling portion through a second heat conduction pad.

12. The battery module according to claim 10, wherein:
the second part has a first flow sub-channel;
the third part has a second flow sub-channel; and
the first flow sub-channel and the second flow sub-channel are arranged opposite to each other to form the first flow channel.

13. The battery module according to claim 12, wherein:
the first flow channel comprises a first straight segment and a second straight segment that are arranged in parallel, the first straight segment being in communication with the second straight segment at an end of the first straight segment and an end of the second straight segment through a first detour segment, the other end of the first straight segment being disconnected from the other end of the second straight segment, the other end of the first straight segment having a first port, and the other end of the second straight segment having a second port;
the first part has a third port in communication with the second flow channel, and the fourth part has a fourth port in communication with the second flow channel;
the second straight segment is disposed below the first straight segment at a side of the first straight segment close to the first part, the first port is a liquid inlet, the second port is connected to one of the third port and the fourth port disposed at a same side as the second port through an external pipe, and the other one of the third port and the fourth port is a liquid outlet; and
the second flow channel comprises a third straight segment and a fourth straight segment that are arranged in parallel, the third straight segment being in communication with the fourth straight segment at an end of the third straight segment and an end of the fourth straight segment through a second detour segment, the other end of the third straight segment being disconnected from the other end of the fourth straight segment, the third straight segment being in communication with the third port at the other end of the third straight segment, and the fourth straight segment being in communication with the fourth port at the other end of the fourth straight segment.

14. The battery module according to claim 12, wherein:
the first flow sub-channel and the second flow sub-channel are formed through stamping; and
when the first plate body is in an unbent state, a stamping protrusion of the first flow sub-channel and a stamping protrusion of the second flow sub-channel are oriented in a same stamping direction.

15. The battery module according to claim 13, wherein the first plate body has a plurality of recesses disposed in an array at the corresponding first straight segment and the second straight segment, the plurality of recesses being arranged in an extension direction of the first straight segment or the second straight segment, and each of the plurality of recesses comprising a recess wall, and a recess bottom protruding from the first plate body towards the first flow channel.

16. The battery module according to claim 15, wherein the recess is formed at each of the second part and the third part, a gap being formed between the recess bottom of the recess at the second part and the recess bottom of the recess at the third part after the first plate body is bent to form the first liquid cooling portion.

17. The battery module according to claim 16, wherein the recess is formed through stamping, a stamping direction of the recess being opposite to a stamping direction of the first flow sub-channel or a stamping direction of the second flow sub-channel, and the recess having a smaller stamping height than the first flow sub-channel and the second flow sub-channel.

18. The battery module according to claim 13, wherein the third flow sub-channel has at least one diversion groove arranged in an extension direction of the third straight segment or an extension direction of the fourth straight segment and formed through stamping, a stamping direction of the diversion groove being opposite to a stamping direction of the third flow sub-channel, and a spacing being defined between each of two ends of the diversion groove and the groove surface of the third flow sub-channel.

19. The battery module according to claim 10, wherein the third plate body has a one-piece structure, the third plate body being fixedly connected to the first plate body and/or the second plate body.

* * * * *